(12) United States Patent
Wigren et al.

(10) Patent No.: US 8,170,492 B2
(45) Date of Patent: May 1, 2012

(54) METHODS AND ARRANGEMENTS FOR NOISE RISE ESTIMATION

(75) Inventors: Torbjörn Wigren, Uppsala (SE); Claes Tidestav, Bålsta (SE)

(73) Assignee: Telefonaktiebolaget L M Ericsson (PUBL)

( * ) Notice: Subject to any disclaimer, the term of this patent is extended or adjusted under 35 U.S.C. 154(b) by 769 days.

(21) Appl. No.: 12/296,751

(22) PCT Filed: Apr. 10, 2006

(86) PCT No.: PCT/SE2006/050066
§ 371 (c)(1),
(2), (4) Date: Oct. 10, 2008

(87) PCT Pub. No.: WO2007/117188
PCT Pub. Date: Oct. 18, 2007

(65) Prior Publication Data
US 2009/0176455 A1   Jul. 9, 2009

(51) Int. Cl.
*H04B 1/10* (2006.01)
(52) U.S. Cl. .......... 455/67.13; 455/226.2; 455/135; 455/226.3; 455/277.2

(58) Field of Classification Search .......... 455/226.2, 455/453, 310, 69, 501, 63.1, 67.13, 135, 455/226.3, 277.2, 445
See application file for complete search history.

(56) References Cited

U.S. PATENT DOCUMENTS
2003/0194979 A1* 10/2003 Richards et al. .......... 455/216
2006/0068717 A1*  3/2006 Gandhi et al. .......... 455/67.13

OTHER PUBLICATIONS
Merriam-Webster's collegiate dictionary. 10th ed.; 1997.*

* cited by examiner

*Primary Examiner* — Edward Urban
*Assistant Examiner* — Stacey Sorawat

(57) ABSTRACT

A received total wideband power in a wireless communications system is measured (202) a number of times during a time interval. A site communication throughput is determined (204) and processed (206) into a time averaged site communication throughput. A probability distribution for received total wideband power is estimated (210) from the measured received total wide-band power. An estimate of a noise floor measure is computed (214) based on the probability distribution for received total wideband power and a noise rise measure is calculated (218) based on the probability distribution for received total wideband power and the estimate of a noise floor measure. According to the present invention, an adjustment (208) of the noise rise measure is provided based on the averaged site communication throughput.

16 Claims, 11 Drawing Sheets

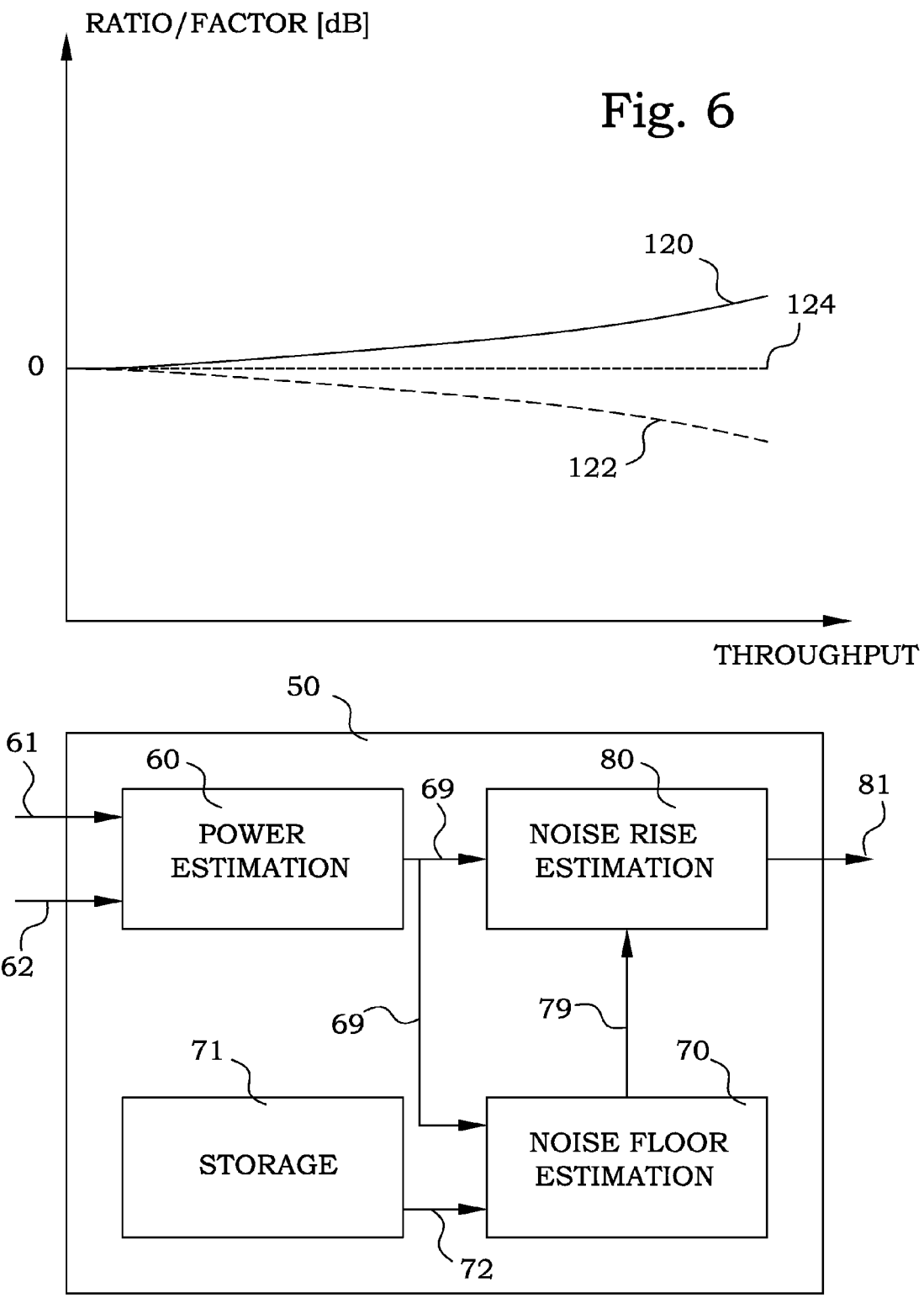

METHODS AND ARRANGEMENTS FOR NOISE RISE ESTIMATION

TECHNICAL FIELD

The present invention relates in general to methods and devices for estimation of load estimation in cellular communications systems, and in particular to noise-rise estimation in code division multiple access communications systems.

BACKGROUND

Wideband Code Division Multiple Access (WCDMA) telecommunication systems have many attractive properties that can be used for future development of telecommunication services. A specific technical challenge in e.g. WCDMA and similar systems is the scheduling of enhanced uplink channels to time intervals where the interference conditions are favourable, and where there exist a sufficient capacity in the uplink of the cell in question to support enhanced uplink channels. It is well known that existing users of the cell all contribute to the interference level in the uplink of WCDMA systems. Further, terminals in neighbour cells also contribute to the same interference level. This is because all users and common channels of a cell transmit in the same frequency band when CDMA technology is used. The load of the cell is directly related to the interference level of the same cell.

In order to retain stability of a cell, the load needs to be kept below a certain level. This follows since the majority of uplink user channels, at least in WCDMA, are subject to power control. This power control aims at keeping the received power level of each channel at a certain signal to interference ratio (SIR), in order to be able to meet specific service requirements. This SIR level is normally such that the received powers in the radio base station (RBS) are several dBs below the interference level. De-spreading in so called RAKE-receivers then enhance each channel to a signal level where the transmitted bits can be further processed, e.g. by channel decoders and speech codecs that are located later in the signal processing chain.

Since the RBS tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. In case a high capacity channel would suddenly appear, the raise in the interference becomes large and the risk for instability, a so called power rush, increases. It is thus a necessity to schedule high capacity uplink channels, like the enhanced uplink (E-UL) channel in WCDMA, so that one can insure that instability is avoided. In order to do so, the momentary load must be estimated in the RBS. This enables the assessment of the capacity margin that is left to the instability point.

The load of a cell in e.g. a CDMA system is usually referred to some quantity related to power, typically noise rise. A number of noise rise measures do exist. The most important one is perhaps the Rise over Thermal (RoT) that is defined as the quotient of the total interference of the cell and the thermal noise power floor of the receiver of the RBS. Other measures include e.g. in-band non-WCDMA interference with respect to the thermal noise floor. Consequently, power quantities, such as total power level and noise floor (ideally thermal noise floor), have to be determined. Determinations of noise floor according to prior art is typically associated with relatively large uncertainties, which even may be in the same order of magnitude as the entire available capacity margin. This is particularly true when only measurements of total received power are available. It will thus be very difficult indeed to implement e.g. enhanced uplink channel functionality without improving the load estimation connected thereto.

It could furthermore be mentioned that an equally important parameter that requires load estimation for its control, is the coverage of the cell. The coverage is normally related to a specific service that needs to operate at a specific SIR to function normally. The uplink cell boundary is then defined by a terminal that operates at maximum output power. The maximum received channel power in the RBS is defined by the maximum power of the terminal and the pathloss to the digital receiver. Since the pathloss is a direct function of the distance between the terminal and the RBS, a maximum distance from the RBS results. This distance, taken in all directions from the RBS, defines the coverage.

It now follows that any increase of the interference level results in a reduced SIR that cannot be compensated for by an increased terminal power. As a consequence, the pathloss needs to be reduced to maintain the service. This means that the terminal needs to move closer to the RBS, i.e. the coverage of the cell is reduced.

From the above discussion it is clear that in order to maintain the cell coverage that the operator has planned for, it is necessary to keep the load below a specific level. This means that load estimation is important also for coverage. In particular load estimation is important from a coverage point of view in the fast scheduling of enhanced uplink traffic in the RBS. Furthermore, the admission control and congestion control functionality in the radio network controller (RNC) that controls a number of RBSs also benefits from accurate information on the momentary noise rise of the cell.

SUMMARY

A general problem with prior art CDMA communications networks is that load estimations are presented with an accuracy which makes careful load control difficult. In particular, determination of noise rise suffers from significant uncertainties, primarily caused by difficulties to estimate the noise floor.

A general object of the present invention is to provide improved methods and arrangements for determining power-related quantities, e.g. load estimation. A further object of the present invention is to provide methods and arrangements giving opportunities for more accurate determination of power-related quantities. Yet a further object of the present invention is to provide methods and arrangements for improving noise rise estimations.

The above objects are achieved with methods and devices according to the enclosed patent claims. In general words, a received total wideband power in a wireless communications system is measured a number of times during a time interval. A site communication throughput is determined and processed into a time averaged site communication throughput. A probability distribution for received total wideband power is estimated from the measured received total wideband power. An estimate of a noise floor measure is computed based on the probability distribution for received total wideband power and a noise rise measure is calculated based on the probability distribution for received total wideband power and the estimate of a noise floor measure. According to the present invention, an adjustment of the noise rise measure is provided based on the averaged site communication throughput.

Preferably; the adjustment is performed by adjusting a variance of the probability distribution for received total wideband power based on the averaged site communication throughput. When the step of estimating a probability distribution for received total wideband power is performed by a Kalman filtering process, a noise contribution can be modelled as dependent on the averaged site communication throughput. Adjustments can also be performed on the noise rise measure according to a predetermined function of the averaged site communication throughput or on the estimate of a noise floor measure e.g. according to a predetermined function of said averaged site communication throughput.

An advantage with the present invention is that the accuracy of thermal noise floor estimation is improved in the sense that an appropriate performance is extended to a wider operating load range while the complexity still is kept low.

BRIEF DESCRIPTION OF THE DRAWINGS

The invention, together with further objects and advantages thereof, may best be understood by making reference to the following description taken together with the accompanying drawings, in which:

FIG. 6 is a diagram illustrating noise floor errors and adjustment according to the present invention;

FIG. 7 is a block scheme of an embodiment of a noise rise estimation arrangement according to the present invention;

DETAILED DESCRIPTION

Throughout the entire disclosure, bold letters in equations refer to vector or matrix quantities.

The present detailed description is introduced by a somewhat deeper discussion about how to perform load estimation and the problems encountered by prior art solutions, in order to reveal the seriousness thereof. This is done with reference to a typical WCDMA system, but the ideas are not restricted to WCDMA. They are rather applicable in many types of cellular systems.

Reference and Measurement Points

Figure 1:
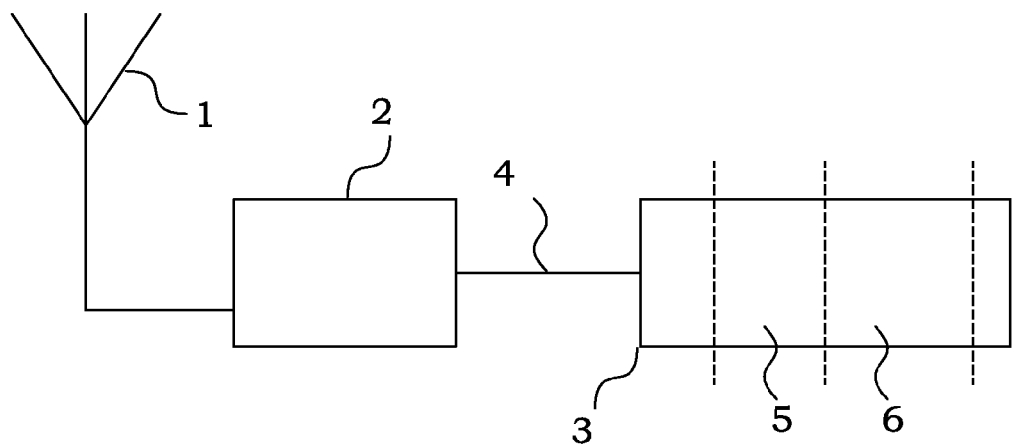
FIG. 1 shows a signal chain of a radio base station performing load estimation.

A typical signal chain of a RBS is depicted in FIG. 1. A received wideband signal from an antenna 1 first passes an analogue signal conditioning chain 2, which consists of cables, filters etc. Variations among components together with temperature drift, render the scale factor of this part of the system to be undetermined with about 2-3 dBs, when the signal enters a receiver 3. This is discussed further below. In the receiver 3, a number of operations take place. For load estimation it is normally assumed that a total received wideband power is measured at some stage, in FIG. 1 denoted by 5. Furthermore, it is assumed in this embodiment that code power measurements, i.e. powers of each individual channel/user of the cell, are made available at a stage 6. A reference point for estimated quantities is referred to as 4. The points in the chain where estimated quantities are valid, and where measurements are taken, are schematically shown in FIG. 1.

There are several reasons for the difficulties to estimate the thermal noise floor power. One reason as indicated above is that the thermal noise floor power, as well as the other received powers, is affected by component uncertainties in the analogue receiver front end. The signal reference points are, by definition, at the antenna connector. The measurements are however obtained after the analogue signal conditioning chain, in the digital receiver. These uncertainties also possess a thermal drift.

The analogue signal conditioning electronics chain does introduce a scale factor error of 2-3 dB between RBSs (batch) that is difficult to compensate for. The RTWP (Received Total Wideband Power) measurement that is divided by the default value of the thermal noise power floor may therefore be inconsistent with the assumed thermal noise power floor by 2-3 dB. The effect would be a noise rise estimate that is also wrong by 2-3 dB. Considering the fact that the allowed noise rise interval in a WCDMA system is typically 0-10 dB, an error of 2-3 dB is not acceptable.

Fortunately, all powers forming the total received power are equally affected by the scale factor error $\gamma(t)$ so when the noise rise ratio $N_R(t)$ is calculated, the scale factor error is cancelled as $$\begin{aligned} N_R(t) &= N_R^{DigitalReceiver}(t) \\ &= \frac{P^{Total,DigitalReceiver}(t)}{P_N^{DigitalReceiver}} \\ &= \frac{\gamma(t)P^{Total,Antenna}(t)}{\gamma(t)P_N^{Antenna}} \\ &= \frac{P^{Total,Antenna}(t)}{P_N^{Antenna}} \\ &= N_R^{Antenna}(t) \end{aligned} \qquad (1)$$

where $N_R^{DigitalReceiver}(t)$ and $N_R^{Antenna}(t)$ are the noise rise ratios as measured at the digital receiver 3 (FIG. 1) and at the antenna 1 (FIG. 1), respectively, $P^{Total,DigitalReceiver}(t)$ and $P^{Total,Antenna}(t)$ are the total received powers at the digital receiver 3 and the antenna 1, respectively, and $P_N^{DigitalReceiver}$ and $P_N^{Antenna}$ are the thermal noise level as measured at the digital receiver 3 and the antenna 1, respectively. However, note that (1) requires measurement of the noise floor $P_N^{DigitalReceiver}$ in the digital receiver. This is a major difficulty that is addressed by the present invention.

Power Measurements

In the detailed description the following general notations are used:

Measurements of the total received wideband power are performed in the receiver. This measurement is denoted by $P_{Total}(t)$, where t denotes discrete time. The measurement rate is $T^{-1}$ Hz.

Noise Rise

Figure 2:
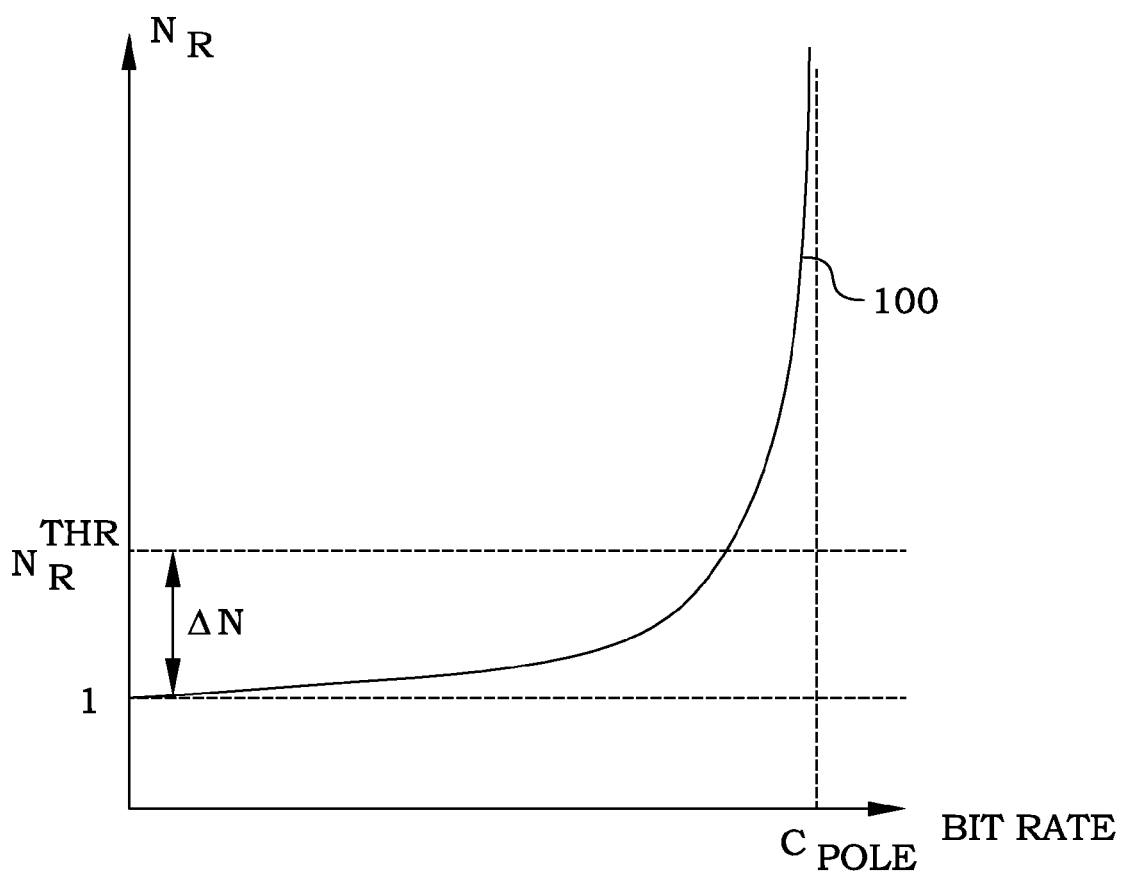
FIG. 2 illustrates a typical relation between noise rise and total bitrate in a cell.

As indicated in the background section, the result of introducing additional channels becomes an increase of the total power. FIG. 2 is a diagram illustrating these conditions. Noise rise $N_R$, defined as the ratio between a total power and the thermal noise level $P_N$ as measured at the antenna connector, also referred to as the noise floor, is a measure of the load. Above a noise rise threshold $N_R^{thr}$, the situation becomes unstable. A relation 100 between total bit rate and noise rise $N_R$ is known from the design of the control loops, and scheduling of additional channels can be performed once the instantaneous noise rise $N_R$ has been determined. The pole capacity, $C_{pole}$, denotes the maximum bitrate capacity in bits per second. A typical difference $\Delta N$ between the threshold $N_R^{thr}$ and the level defined by the thermal noise level $P_N$ is typically about 7-10 dB. However, the noise floor or thermal noise level $P_N$ is not readily available. For instance, since scale factor uncertainties in the receiver may be as large as 2-3 dB as discussed above, a large part of the available margin is affected by such introduced uncertainties.

Observability of Noise Floor

One reason for the difficulties to estimate the thermal noise floor power now appears, since even if all measurements are made in the digital receiver, the noise floor cannot be directly measured, at least not in a single RBS. The explanation is that neighbour cell interference and interference from external sources also affect the receiver, and any mean value of such sources cannot be separated from the noise floor. Power measurements on the own cell channels may in some cases be performed, increasing the complexity of the system. Such measurements do however not solve the entire problem, although they may improve the situation somewhat.

Figure 3:
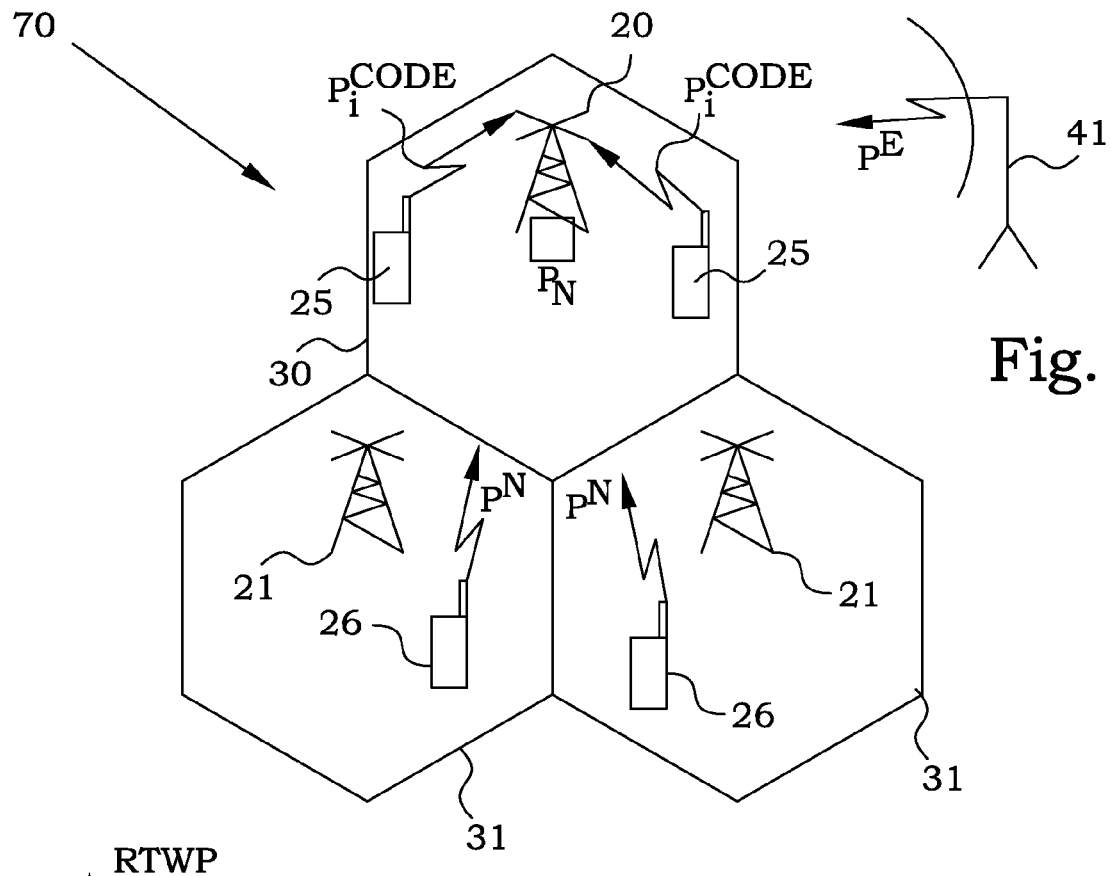
FIG. 3 is a schematic illustration of signal powers occurring in a typical mobile communications network.

FIG. 3 illustrates the contributions to power measurements in connection with an RBS 20. The RBS 20 is associated with a cell 30. Within the cell 30, a number of mobile terminals 25 are present, which communicates with the RBS 20 over different links, each contributing to the total received power by $P_i^{Code}(t)$. The cell 30 has a number of neighbouring cells 31 within the same WCDMA system, each associated with a RBS 21. The neighbouring cells also comprise mobile terminals 26. The mobile terminals 26 emit radio frequency power and the sum of all such contributions is denoted by $P^N$. There may also be other network external sources of radiation, such as e.g. a radar station 41. Contributions from such external sources are denoted by $P^E$. Finally, the $P_N$ term arises from the receiver itself.

It is clear from the above that $P^N(t)$ and $P_N$ are not measurable and hence need to be estimated or eliminated in some way. The situation becomes even worse if only measurements of total wide band power are available. Total wide band power measurement $P_{Measurement}^{Total}(t)$ can be expressed by:

$$P_{Measurement}^{Total}(t) = \sum_{i=1}^{n} P_i^{Code}(t) + P^{E+N}(t) + P_N(t) + e^{Total}(t), \quad (2)$$

where $$P^{E+N} = P^E + P^N, \quad (3)$$

and where $e^{Total}(t)$ models measurement noise.

It can be mathematically proved that a linear estimation of $P^{E+N}(t)$ and $P_N$ is not an observable problem. Only the sum $P^{E+N} + P_N$ is observable from available measurements. This is true even in case code power measurements are performed. The problem is that there is no conventional technique that can be used to separate the noise floor from power mean values originating from neighbour cell interference and in-band interference sources external to the cellular system. Furthermore, if only measurements of total received wide band power is available, also the individual code power contributions are indistinguishable from the other contribution.

Noise Floor Estimations

Yet another reason for the difficulty with noise rise estimation is that the thermal noise floor is not always the sought quantity. There are situations where constant in-band interference significantly affects the receiver of the RBS. These constant interferers do not affect the stability discussed above, they rather appear as an increased noise temperature, i.e. an increased thermal noise floor.

In prior art, one alternative is to use costly and individual determination of the thermal noise floor of each RBS in the field, in order to achieve a high enough load estimation performance. The establishment of the default value for the thermal noise power floor, as seen in the digital receiver requires reference measurements performed over a large number of RBSs either in the factory or in the field. Both alternatives are costly and need to be repeated as soon as the hardware changes.

The above approach to solve the problem would require calibration of each RBS individually. This would however be very costly and is extremely unattractive. Furthermore, temperature drift errors in the analogue signal conditioning electronics of perhaps 0.7-1.0 dB would still remain.

Another approach is to provide an estimation of the thermal noise power floor. One principle for estimation of the thermal noise power floor is to estimate it as a minimum of a measured or estimated power quantity comprising the thermal noise floor. This minimum is typically computed over a pre-determined interval of time. If no code power measurements are available, the power in question is the total received wideband power. One approach would therefore be to calculate the noise rise as a division of the momentary total received wideband power with an established thermal noise floor power estimated as a minimum of the total received wideband power over a predetermined interval of time.

Figure 4A:
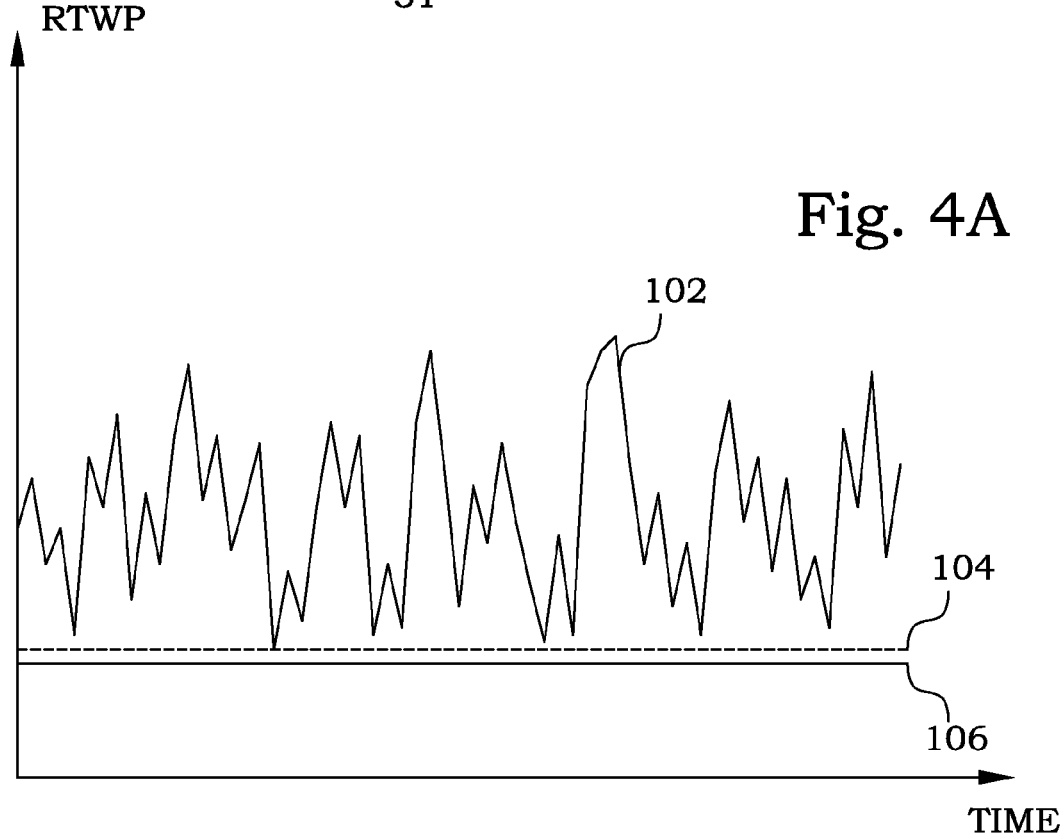
FIGS. 4A-B are time diagrams of received total wideband power at two different site communication throughput levels.

This is schematically illustrated in FIG. 4A. Momentary values 102 of a received total wideband power are here illustrated as a function of time. The values fluctuate considerably depending on the momentary load. It is known that the thermal noise floor contribution always is present, and consequently it can be concluded that if measurement uncertainties are neglected, the noise floor contribution has to be equal to or smaller than the minimum value 104 of the total received wideband power received within a certain period of time. If there is a reasonable probability that all code power contributions, neighbour cell contributions and other external contributions at some occasion are equal to zero, the minimum value 104 is a good estimation of the "true" noise floor 106. However, in all situations, it is certain that the minimum value 104 constitutes an upper limit of the unknown noise floor.

In order to improve the estimation of the noise floor, a recursive estimation filter can be applied to the series of measurements, providing estimates of the received total wideband power, as well as the variance thereof. The thermal noise power floor may then be estimated by soft algorithms, described in detail further below.

Figure 4B:
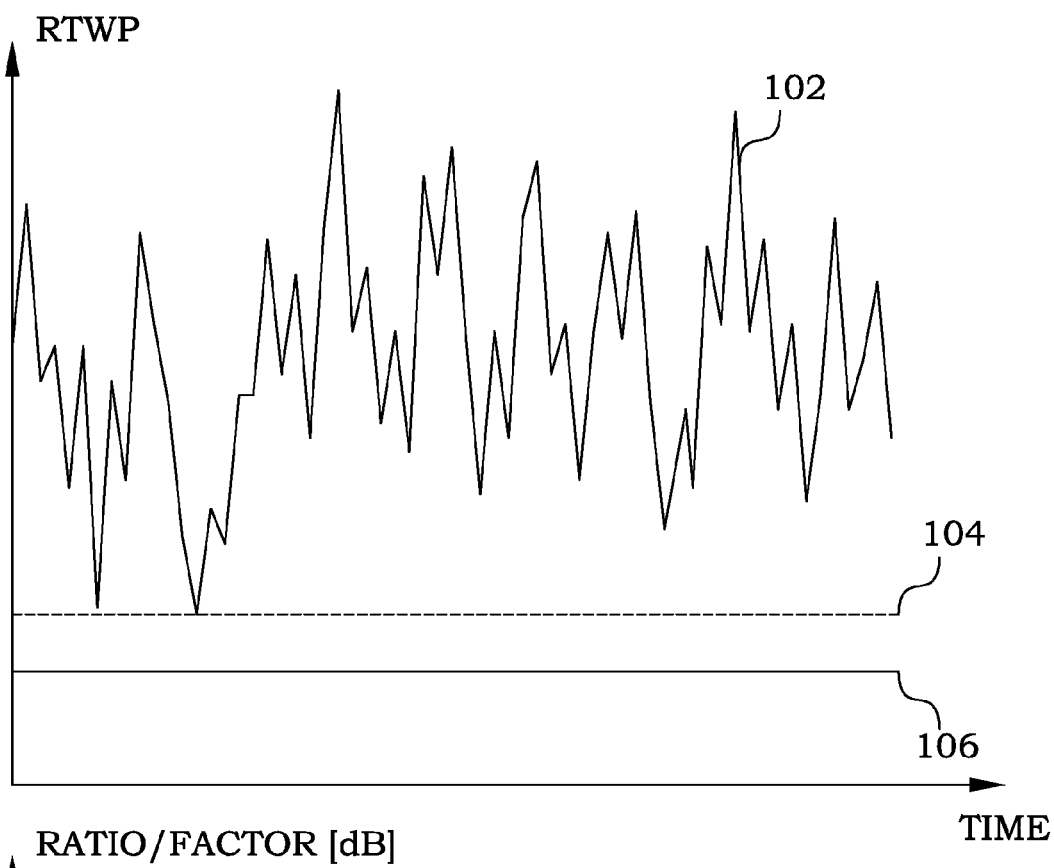

When only the received total wideband power is available, and not the individual code powers, the probability that all code power contributions, neighbour cell contributions and other external contributions at some occasion are equal to zero varies with the average load. FIG. 4B illustrates a measurement situation where the average throughput through the RBS in question is larger than in FIG. 4A. This is obvious since it can easily be seen that the average received total wideband power is notably increased. Another effect will also be that when the long term average load of the system increases, then normally the neighbour cell interference increases. The consequence is that the likelihood of total power measurements or estimations in the vicinity of the true noise floor 106 will be reduced. Measurement results very close to the true noise floor will also be less probable. All these effects will together result in that a determined minimum value 104 will be less appropriate as a noise floor estimation for high load situations. Consequently, a noise rise measure determined based on such a noise floor estimation will in general be underestimated, which in turn increases the risk for e.g. power rushes.

According to the present invention, a site communication throughput is measured at a number of occasions in parallel with the measurements of received total wideband power. This site communication throughput is a measure of the number of bits per second that is transmitted through a base station or cell. The site communication throughput can be defined for uplink communication, downlink communication or for both uplink and downlink communication. The measured site communication throughput is processed into a time averaged site communication throughput, in order to remove fast fluctuations. Such an averaging processing could be a recursive filter having a certain time constant or, equivalently, bandwidth. An example of such an averaging is given further below.

The noise rise measure is according to the present invention adjusted based on this time averaged site communication throughput. As described more in detail in the different embodiments below, such an adjustment can be performed at different stages in the determination of the noise rise. One alternative is to adjust the final noise rise measure with a certain factor according to a predetermined function of time averaged site communication throughput. Another alternative is to adjust the noise floor estimate before calculating the noise rise measure. When estimation filtering of the received total wideband power is utilized, the variance of the estimated received total wideband power can be adjusted based on the time averaged site communication throughput, which will counteract the decreased probability of low received total wideband power measurements somewhat. In other words, the estimated probability distribution will be modified. It is also an alternative to let the time averaged site communication throughput already influence the model used for estimating the received total wideband power. Here, one choice is to increase the magnitude of the introduced measurement noise function as a function of the time averaged site communication throughput.

Figure 5:
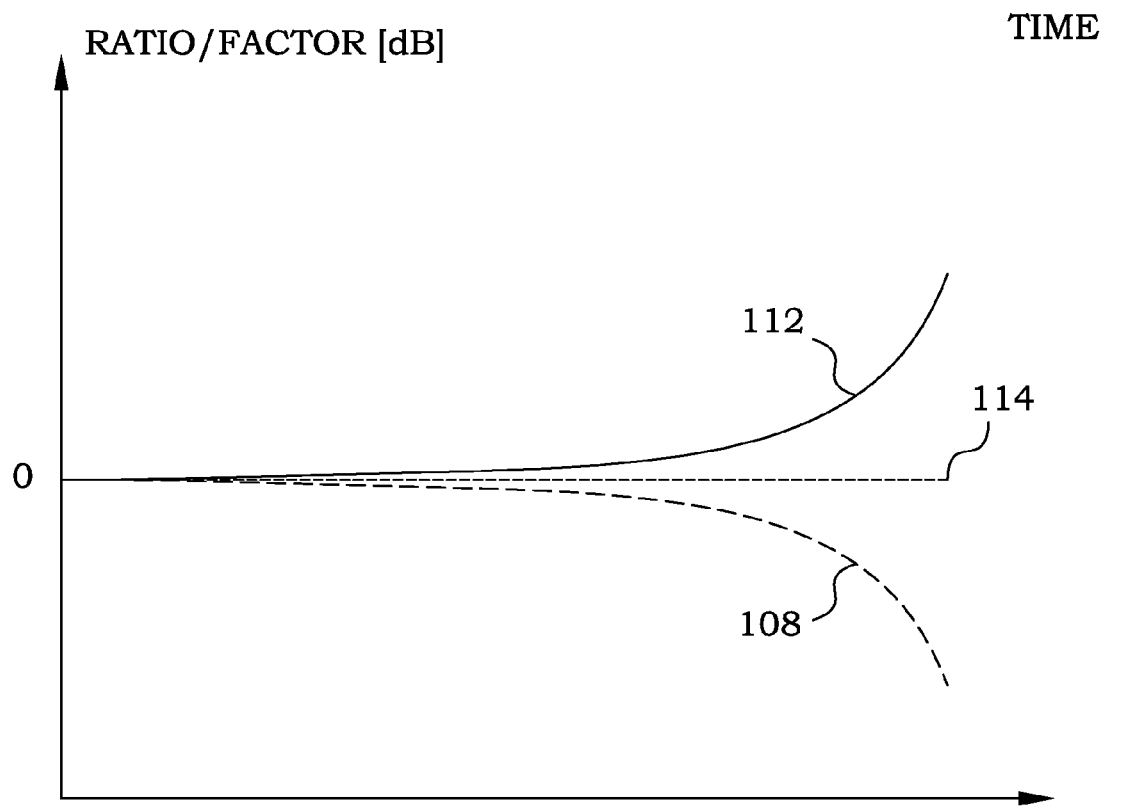
FIG. 5 is a diagram illustrating noise rise errors and adjustment according to the present invention.

FIG. 5 illustrates a curve 108, which indicates an expected behaviour of a ratio between an estimated noise rise without throughput compensation and a "true" noise rise. At higher time averaged site communication throughput, the noise rise will generally be underestimated. By adjusting the estimated noise rise according to a function 112, which corresponds to the inverted function of the curve 108, the adjusted noise rise 114 should follow the "true" noise rise. This can be performed in the dB-domain, as illustrated in FIG. 5, whereby the adjustment becomes an addition. It can also be performed in the linear domain, whereby the adjustment becomes a multiplication. The idea is simple. However, the shape of the curve 108 may be difficult to measure of theoretically predict for each individual base station, as well as for different types of traffic.

FIG. 6 illustrates a curve 120, which indicates an expected behaviour of a ratio between an estimated noise floor without throughput compensation and a "true" noise floor. At higher time averaged site communication throughput, the noise floor will generally be overestimated. By adjusting the estimated noise floor according to a function 122, which corresponds to the inverted function of the curve 120, the adjusted noise floor 124 should follow the "true" noise floor. This can be performed in the dB-domain, as illustrated in FIG. 6, whereby the adjustment becomes a subtraction. It can also be performed in the linear domain, whereby the adjustment becomes a division. The idea is simple. However, also the shape of this curve 120 may be difficult to measure of theoretically predict for each individual base station, as well as for different types of traffic.

In a preferred embodiment, the adjustment of the noise rise takes place within or at least in direct connection with an estimation filtering of the received total wideband power. FIG. 7 illustrates a block diagram of an embodiment of such a setup.

A noise rise estimation arrangement 50 comprises three main blocks 60, 70, 80. In a first, power estimation block 60, a Kalman filter arrangement receives inputs 61, in the present embodiment the measured received total wideband power RTWP. Mathematical details of preferred embodiment are disclosed in Appendix A. The output 69 from the power estimation block 60 is the estimate of the received total wideband power RTWP and the corresponding variance. Since the outputs are from the Kalman filter arrangement, these parameter are the only ones needed to define the estimated Gaussian distribution that is produced by the filter. Thus, enough information is given to define the entire probability distribution information of the RTWP estimate. The filter details are discussed more in detail further below.

In a second, conditional probability distribution estimation block 70, an arrangement based on Bayesian statistics receives the RTWP estimate and the corresponding standard deviation 69 as inputs, and provides an output 79 comprising parameters associated with a noise floor power. This may be a single value of a noise floor power or parameters of an estimated probability distribution of a noise floor power. Prior known parameters representing histograms of probability density functions of noise floor is stored in a storage 71 providing information 72 about a prior expected probability distribution of the noise floor power to the conditional probability distribution estimation block 70, in order to achieve an optimal estimation.

The effect on the subsequent noise power floor estimation processing block is beneficial, but intricate to understand. A highly technical explanation follows for the interested reader.

Note that when the long term average load of the system increases, then normally the neighbour cell interference increases. The consequence is that the likelihood of low values of the estimated total power is reduced with increasing neighbour cell interference. The soft noise power floor estimation algorithm operates by removing portions of the prior probability distribution of the thermal noise power floor, from above, by application of a calculation of the probability distribution of the minimum of the estimated total power. This moves the centre of gravity of the prior distribution towards lower values, thereby reducing the optimal estimate of the thermal noise power floor. The amount that is cut away is determined by the probability distributions of the estimated total power that fall within a pre-determined, sparsely sampled sliding window. Then a total power probability distribution with a larger variance will obviously cut away a larger portion of the prior probability distribution than one with the same mean value and a smaller variance. The reason is that the probability distribution function with the larger variance extends further into the region of nonzero support of the prior probability distribution.

The detailed mathematical description of the estimation of the conditional probability distribution is given in Appendix B.

In a third, noise rise estimation block 80, the estimated probability distribution of the noise floor 79 and the RTWP estimate and the corresponding standard deviation 69 are received as inputs, and provides primarily an output 81 comprising a noise rise value. In this embodiment, the preferred noise rise measure is defined according to:

$$RoT(t) = \frac{P^{Total}(t)}{P_N}, \quad (4)$$

where $P^{Total}(t)$ is a received total wideband power, however, also other noise rise measures can be utilized.

The blocks 60, 70 and 80 are preferably integrated into one processor. However, any arrangements comprising, but not limited to, different distributed solutions are also possible to use, where the processor means comprising the blocks 60, 70 and 80 may be considered as a distributed processor means.

Figure 8A:
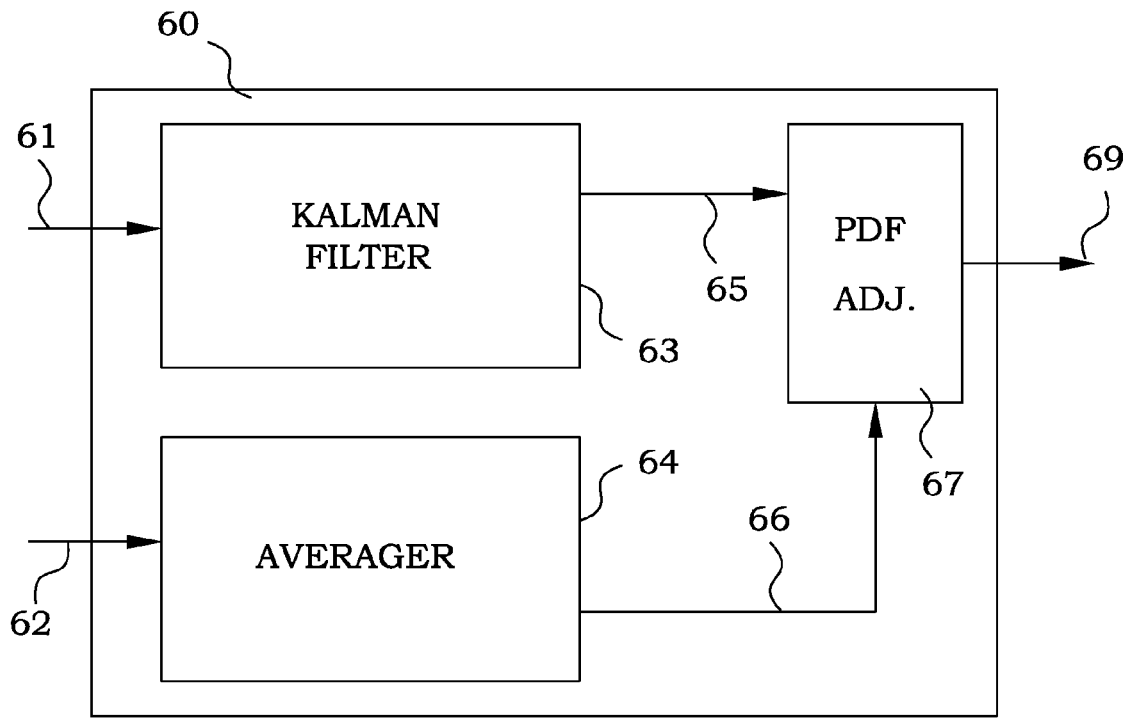
FIGS. 8A-B are block diagrams of embodiments of power estimation means according to the present invention.

In FIG. 8A, a block diagram of an embodiment of a power estimation block 60 is illustrated. The RTWP measurements 61 are provided to a recursive filter, in which an estimate of the RTWP and a corresponding variance are determined and output 65 to a probability density function adjuster 67. The site communication throughput measures 62 are provided to a time averager 64, which provides a time averaged site communication throughput value 66 to the probability density function adjuster 67. The variance of the RTWP is adjusted in the probability density function adjuster 67 according to a pre-defined function and the RTWP and the adjusted corresponding variance is provided as the output 69 from the power estimation block 60.

The time averaging of the site communication throughput can be performed in many different ways, which as such are known in prior art. Sliding window techniques as well as recursive approaches are feasible. One non-exclusive example that has been used in evaluating the present invention is to use a recursive averaging according to:

$$\overline{V}_n = \left(1 - \frac{T_V}{T_A}\right)\overline{V}_{n-1} + \frac{T_V}{T_A}V_n, \quad (5)$$

where $\overline{V}_{n-1}$ and $V_n$ are averaged site communication throughput at two consecutive measurement occasions, $T_V$ is the time between two consecutive measurement occasions, $T_A$ is a time constant and $V_n$ is the site communication throughput at measurement occasion n. However, anyone skilled in the art realises that the averaging can be arranged in many other manners.

Figure 8B:
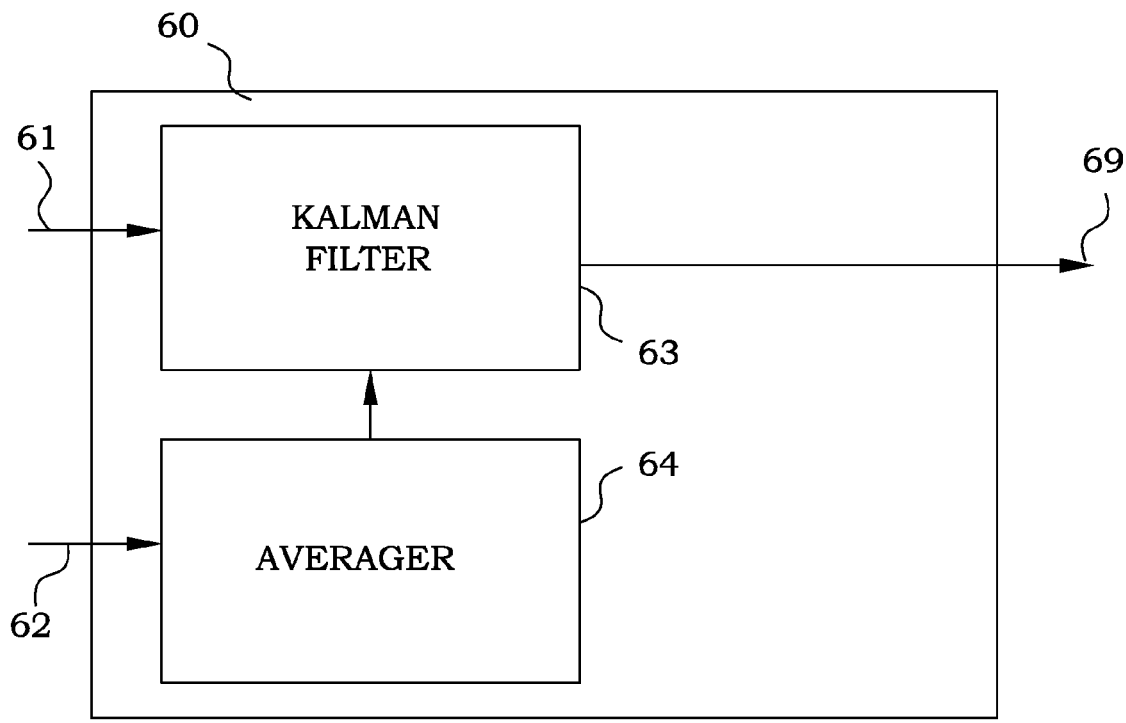

In FIG. 8B, a block scheme of another embodiment of a power estimation block 60 is illustrated. The RTWP measurements 61 are provided to an estimator 63, in this embodiment a recursive filter, in which an estimate of the RTWP and a corresponding variance are determined and used as output 69 from the power estimation block 60. The site communication throughput measures 62 are provided to a time averager 64, for instance arranged according to the above described principles. In this embodiment, the time averaged site communication throughput value 66 is provided to the recursive filter influencing the filter operation. In one preferred embodiment, the averaged site communication throughput is arranged to influence the measurement noise covariance entered into the filter model. More particularly, the sought compensation is introduced by a functional dependence of average throughput in the quotient between the measurement noise covariance and the system noise covariance, of the Kalman filer. Through this an artificial tuning effect is obtained. A suitable functional dependence can be determined from system simulations. The variance of the RTWP will thereby implicitly be adjusted. However, there are also other approaches to achieve implicit variance adjustment through averaged site communication throughput dependent filter modification.

The preferred embodiment can be described in a more mathematical manner.

$$P_{Linear}^{Total} = 10^{-3} 10^{(P_{Measurement}^{Total}(t)/10)} \quad (6)$$

$$F_V = 10^{(k_1 \log 10((3/2)V) + k_2)} \quad (7)$$

$$r_{Measurement} = F_V \times r \quad (8)$$

where $P_{Measurement}^{Total}$ is the measured total wideband power in dBm, $P_{Linear}^{Total}$ is the measured total wideband power in Watts, $k_1$ is a first constant that may be determined experimentally, $k_2$ is a second constant that may be determined experimentally, $F_V$ is a compensatory function "that achieves the purpose of the invention", r is the applied system noise variance of the Kalman filter and $r_{measurement}$ is the applied measurement noise variance of the Kalman filter.

Suitable values for the constants are found to be:

$k_1 = 4.00$ $k_2 = -15.7$.

The Kalman filter (A1) to (A7) in Appendix A is then augmented with relations (6) to (9) at each iteration between (A1) and (A2).

In the description above, it is assumed that the power estimations concern uplink communication. The power measurements are in such cases performed by a node in the radio access network, typically the radio base station. However, at least parts of the procedure, e.g. the determining and/or estimating steps may also be performed in other parts of the communication network, e.g. in a radio network controller.

Figure 10:
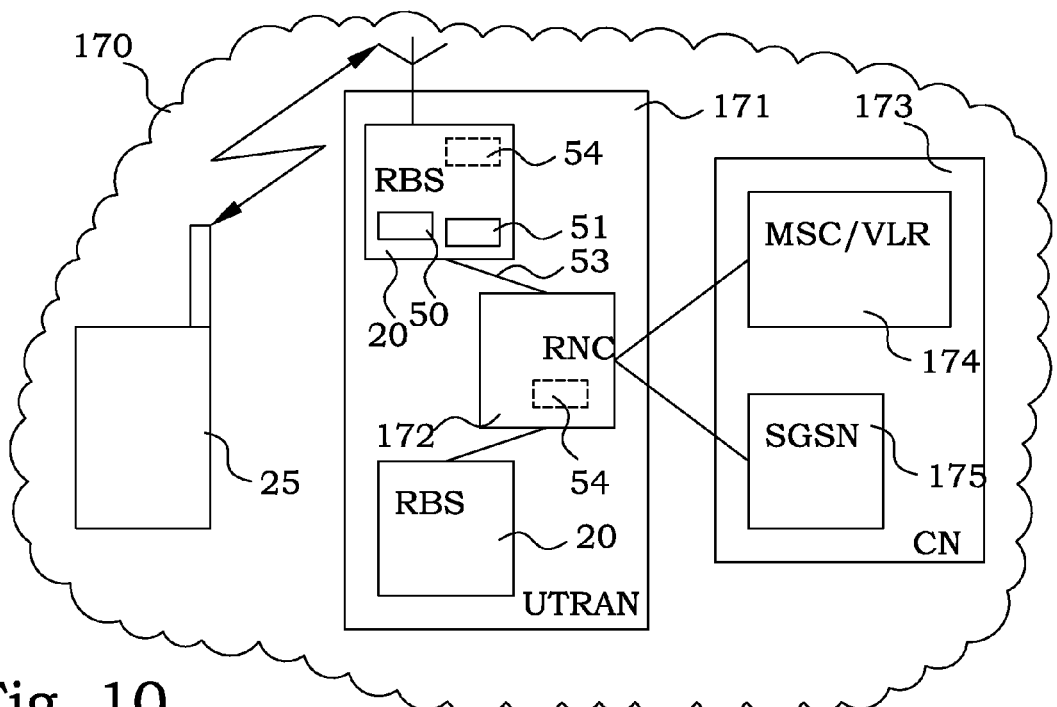
FIG. 10 is a block diagram of main parts of an embodiment of a system according to the present invention.

FIG. 10 illustrates main parts of an embodiment of a system according to the present invention. A wireless communications system 170 comprises a Universal mobile tele-communication system Terrestrial Radio Access Network (UTRAN) 171. A mobile terminal 25 is in radio contact with a RBS 20 in the UTRAN 171. The RBS 20 is controlled by a Radio Network Controller (RNC) 172, which in turn is connected to a Mobile services Switching Centre/Visitor Location Register (MSC/VLR) 174 and a Serving General packet radio system Support Node (SGSN) 175 of a core network CN 173.

In this embodiment, the RBS 20 comprises a power sensing arrangement 51, typically an antenna and front end electronics, for measuring instantaneous received total wideband power and a noise rise estimation arrangement 50. These means 51 and 50 can be implemented as separate units or as at least partly integrated units. In one embodiment, the RBS 20 may itself comprise means 54 for internally determining the site communication throughput, illustrated with broken lines in FIG. 10. In another, alternative embodiment, the RNC 172 may comprise the means 54 for internally determining the site communication throughput, also illustrated with broken lines in FIG. 10, and the RBS 20 receives information of the site communication throughput via the connection 53.

The means 54 and the connection 53 are thus two embodiments of means for obtaining a site communication throughput.

The means for obtaining a site communication throughput 53, 54 is connected to the noise rise estimation arrangement 50 to provide necessary site communication throughput data. The noise rise estimation arrangement 50 can thereby determine an improved appropriate noise rise estimation.

In an alternative embodiment, the means 50-51 are instead comprised in the RNC 172. At least a part of the actual measuring remains typically in the RBS 20 due to the proximity of the antenna. Also other alternative configurations of the means 50, 51, 53 and 54 are possible, as anyone skilled in the art realises.

Figure 11A:
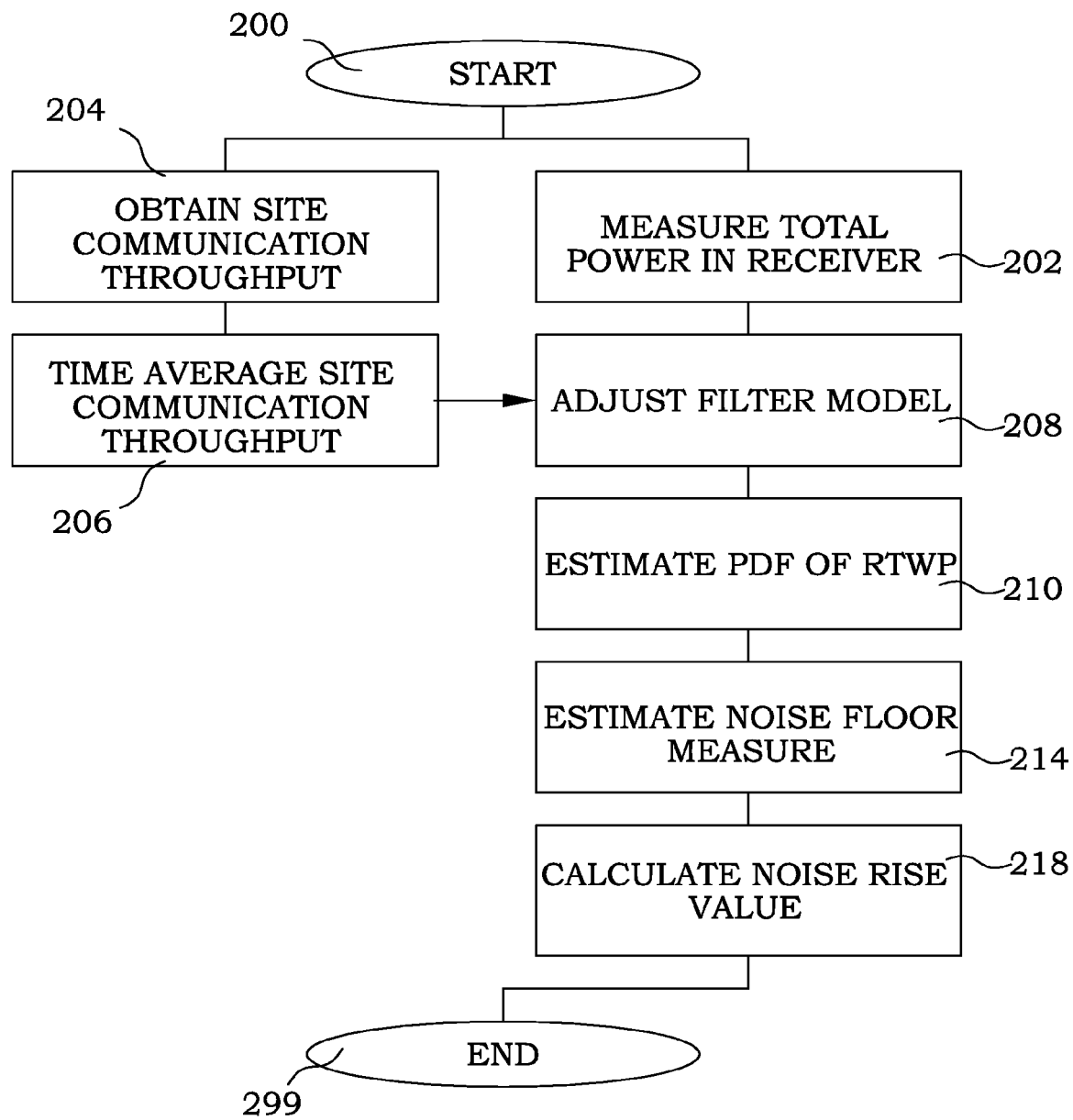
FIGS. 11A-D are flow diagrams of main steps of embodiments of methods according to the present invention.

FIG. 11A illustrates a flow diagram of main steps of an embodiment of a method according to the present invention. The procedure starts in step 200. In step 202, a number of measurements of total received wideband power is made. In step 204, a number of measurements of site communication throughput is made. The measured site communication throughput is processed into a time averaged site communication throughput in step 206. In step 208, a filter model is adjusted based on the averaged site communication throughput. In step 210, a probability distribution for received total wideband power is estimated from at least the measured received total wideband power using the adjusted filter model. In step 214, an estimate of a noise floor measure is computed based on the probability distribution for received total wideband power. Finally, in step 218, a noise rise measure is calculated based at least on the probability distribution for received total wideband power and the estimate of a noise floor measure. The procedure ends in step 299.

Figure 11B:
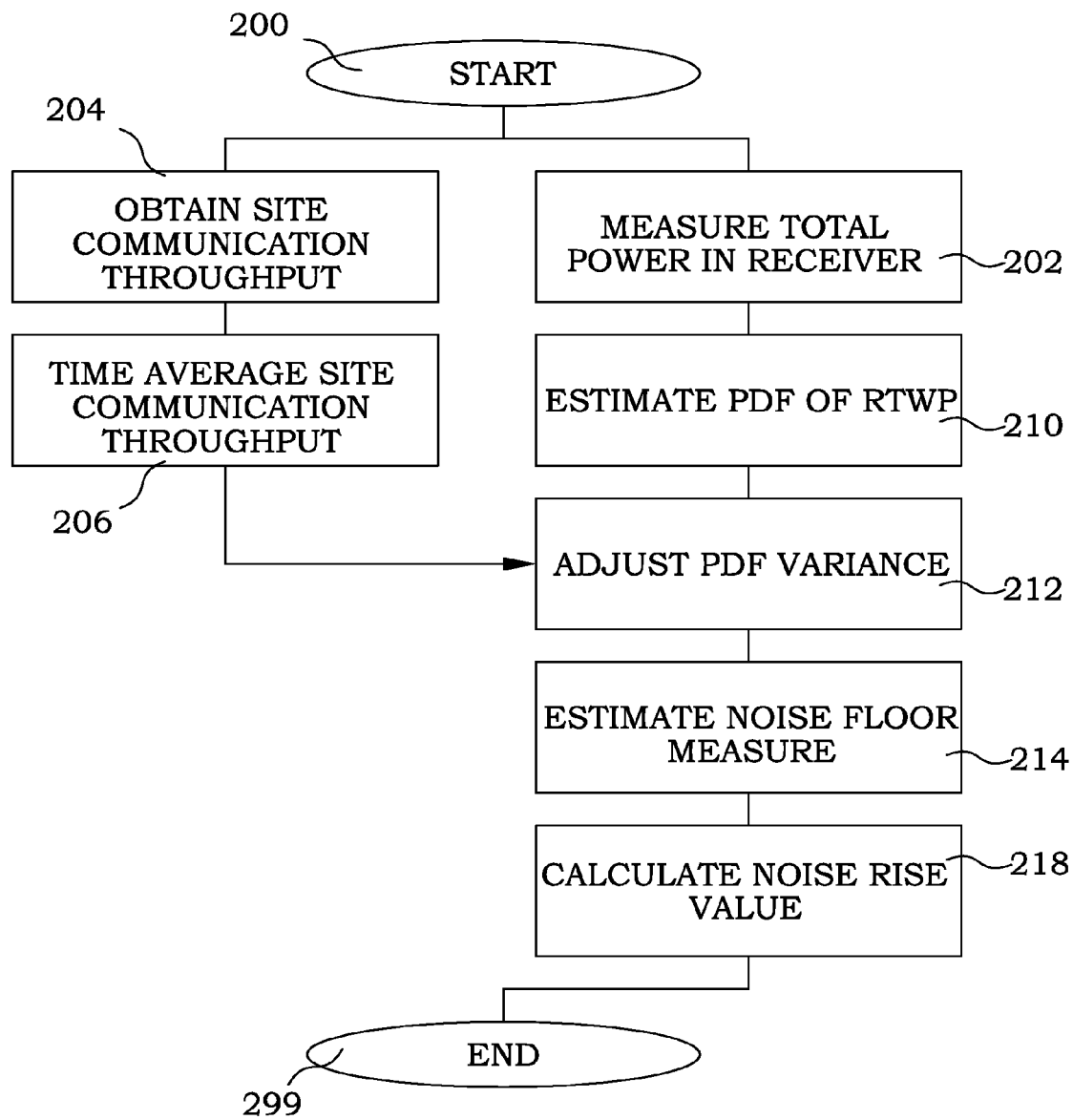

FIG. 11B illustrates a flow diagram of main steps of another embodiment of a method according to the present invention. Steps 200, 202, 204, and 206 are the same as in FIG. 11B. In step 210, a probability distribution for received total wideband power is estimated from at least the measured received total wideband power. In step 212, the variance of the estimated probability distribution for received total wideband power is adjusted based on the averaged site communication throughput. In step 214, an estimate of a noise floor measure is computed based on the adjusted probability distribution for received total wideband power. Finally, in step 218, a noise rise measure is calculated based at least on the adjusted probability distribution for received total wideband power and the estimate of a noise floor measure. The procedure ends in step 299.

Figure 11C:
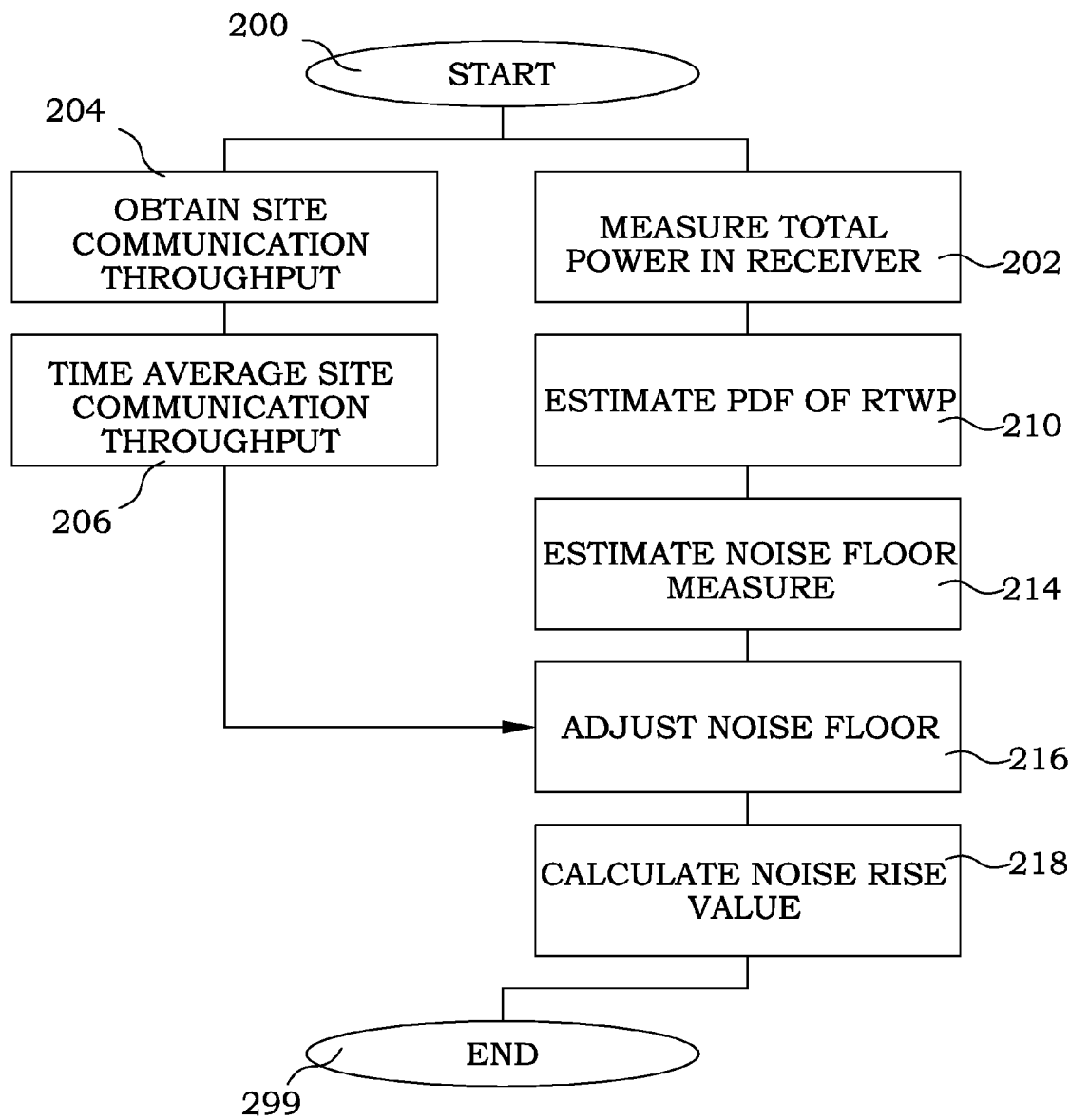

FIG. 11C illustrates a flow diagram of main steps of yet another embodiment of a method according to the present invention. Steps 200, 202, 204, 206 and 210 are the same as in FIG. 11B. In step 214, an estimate of a noise floor measure is computed based on the probability distribution for received total wideband power. In step 216, the estimate of a noise floor measure is adjusted based on the averaged site communication throughput. Finally, in step 218, a noise rise measure is calculated based at least on the probability distribution for received total wideband power and the adjusted estimate of a noise floor measure. The procedure ends in step 299.

Figure 11D:
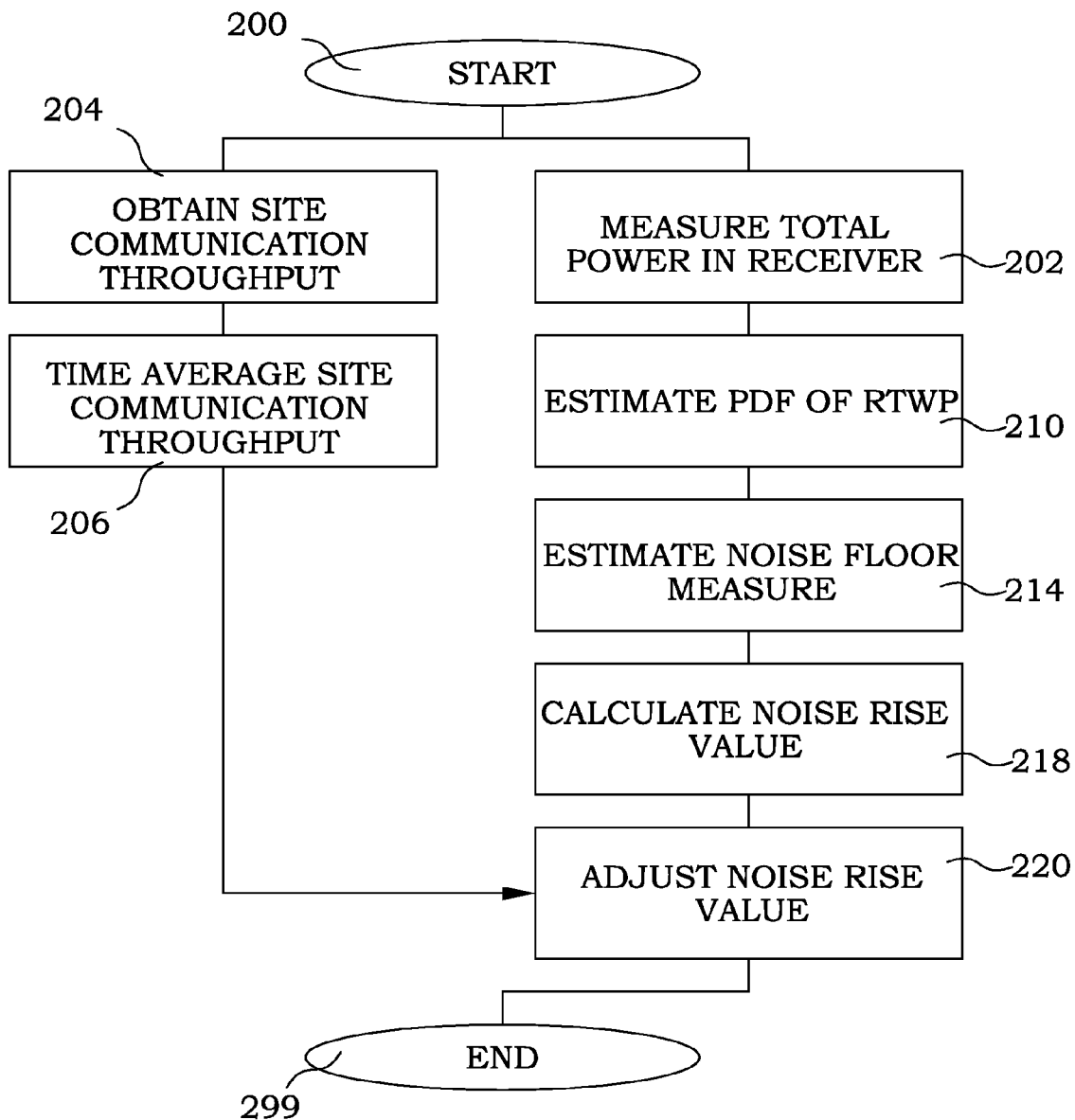

FIG. 11D illustrates a flow diagram of main steps of yet another embodiment of a method according to the present invention. Steps 200, 202, 204, 206, 210 and 214 are the same as in FIG. 11C. In step 218, a noise rise measure is calculated based at least on the probability distribution for received total wideband power and the estimate of a noise floor measure. Finally, in step 220, the noise rise measure is adjusted based on the averaged site communication throughput. The procedure ends in step 299.

Figure 12A:
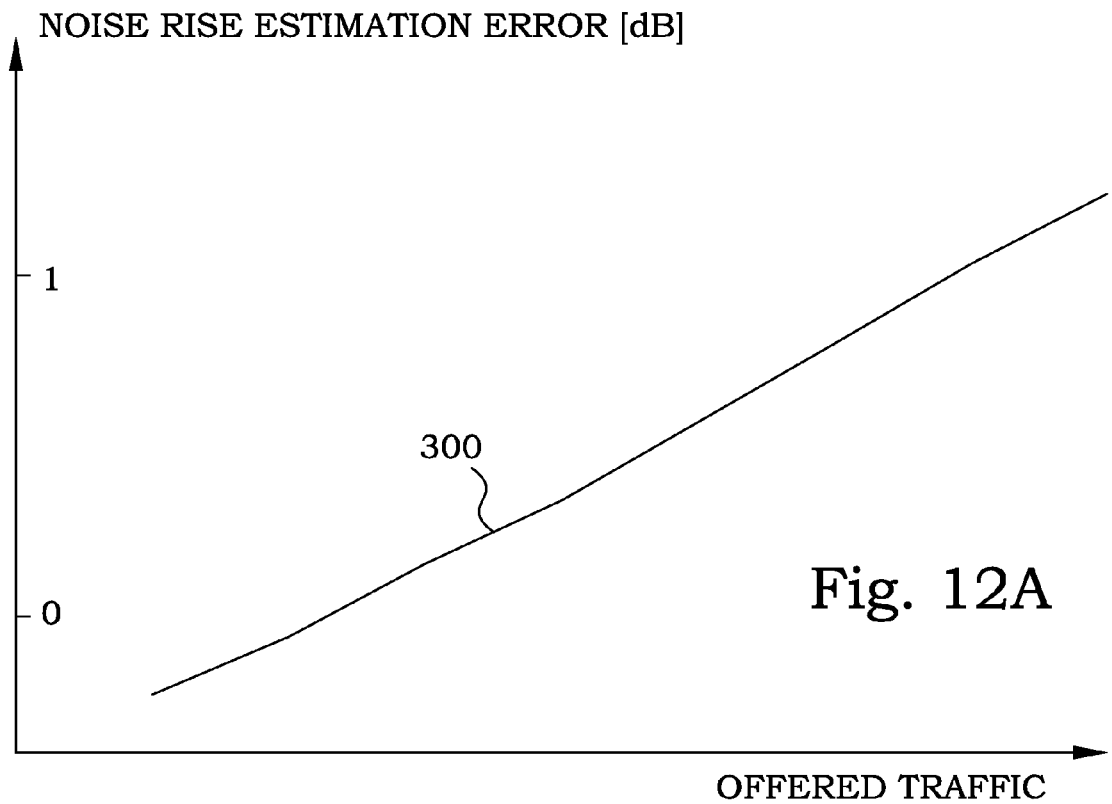
FIGS. 12A-B are diagrams illustrating noise rise estimation errors without and with adjustment according to the present invention, respectively.
Figure 12B:
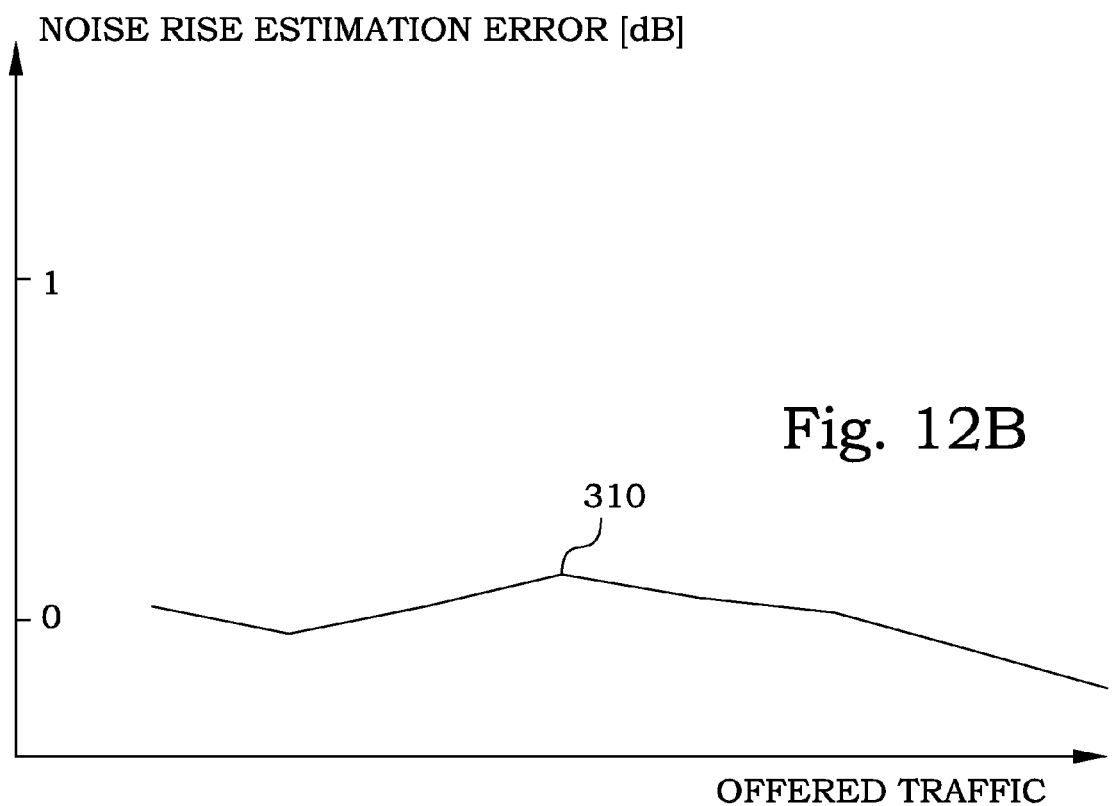

The effect of the present invention can be illustrated by simulations. In FIG. 12A, noise floor estimation errors as obtained by a determination of minimum of RTWP in a receiver without any throughput compensation are illustrated for different offered traffic situations. The traffic was in this simulation speech traffic. In FIG. 12B, corresponding noise floor estimation errors are illustrated, when the principles according to the present invention are applied. One immediately realises the improvement in reliability of noise estimation obtained by the present invention. The improvement is remarkable when considering the relatively simple arrangements that are needed.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

APPENDIX A

Kalman Filter for RTWP Measurements

A proposed algorithm for the case where the total RTWP is measured is a prediction-update filter, where the subscripts distinguish between the prediction and the update steps.

$$K_{Update}(t) = \frac{P_{Prediction}^{Cov}(t - T_{min})}{P_{Prediction}^{Cov}(t - T_{min}) + r_{Measurement}} \quad (A1)$$

$$P_{Update}^{Total}(t) = P_{Prediction}^{Total}(t - T_{min}) + K_{Update}(t) \times (P_{Linear}^{Total}(t) - P_{Prediction}^{Total}(t)) \quad (A2)$$

$$P_{Update}^{Cov}(t) = P_{Prediction}^{Cov}(t - T_{min}) - \frac{P_{Prediction}^{Cov^2}(t - T_{min})}{P_{Prediction}^{Cov}(t - T_{min}) + r_{Measurement}} \quad (A3)$$

$$P_{Prediction}^{Total}(t) = P_{Update}^{Total}(t) \quad (A4)$$

$$P_{Prediction}^{Cov}(t) = P_{Update}^{Cov}(t) + \frac{T_{min}}{T_{Correlation}} r \quad (A5)$$

(A1)-(A5) are repeated increasing t by steps of $T_{min}$.

Initialization is made at t=0 by:

$$P_{Predicton}^{Total}(0) = P_0^{Total} \quad (A6)$$

$$P_{Prediction}^{Cov}(0) = P_0. \quad (A7)$$

As seen above, the updating gain $K_{Update}(t)$ is as seen above computed from the model parameter $r_{Measurement}$ and from a predicted covariance $P_{Prediction}^{Cov}(t-T_{min})$ obtained at the previous sampling instance. The total wideband power updated with the latest measurement $P_{Update}^{Total}(t)$ is then computed, using the prediction $P_{Prediction}^{Total}(t)$ and the new measurement $P_{Measurement}^{Total}(t)$. The next step is to compute the updated covariance $P_{Update}^{Cov}(t)$ from the predicted covariance and from $r_{Measurement}$. In the final steps of iteration new values of $P_{Prediction}^{Total}(t)$ and $P_{Prediction}^{Cov}(t)$ are calculated and the time is stepped. $T_{min}$ denotes the sampling period.

APPENDIX B

Estimation of the Conditional Probability Distribution of $$\min_{t' \in [t-T_{Lag}, t]} P^{Total}(t')$$

Note: It is very natural to estimate minimum powers. However, the choice to use the minimum value is really ad-hoc. In a general case, an extreme value of a quantity in some way dependent on the estimated $P^{Total}$ quantity would be possible to use as a base for the further computations. However, as a simplest embodiment the quantity $$\min_{t' \in [t-T_{Lag}, t]} P^{Total}(t')$$

is considered here. Note that $P^{Total}$ in the coming discussion refers to the received total wideband power.

Notation, Conditional Probability and Baye's Rule

In the following Bayes rule and the defition of conditional mean, for probability distributions, are used extensively. The following definitions and results can be found e.g. in [1] pages 12-14, or any other text book on estimation.

Probability distributions: Consider two events A and B, with probability distributions $f_A(x)$ and $f_B(y)$, respectively. Then the joint probability distribution of A and B is denoted $f_{A,B}(x, y)$.

Note that the events and the conditioning are expressed by subscripts, whereas the independent variables appear within the parentheses. This notation is used only when probability distributions and cumulative probability distributions are used. When state estimates and covariances, e.g. of the Kalman filter, are referred to, the conditioning may also appear within parentheses.

Conditional probability distributions: The conditional probability distributions $f_{A|B}(x)$ and $F_{B|A}(y)$ are defined by:

$$f_{A,B}(x,y) = f_{A|B}(x) f_B(y) = f_{B|A}(y) f_A(x). \tag{B1}$$

Note that as a consequence of the notation for probability distributions, also the conditioning is expressed as subscripts.

A solution of the above equation now results in the famous Bayes rule:

$$f_{A|B}(x) = \frac{f_{B|A}(y) f_A(x)}{f_B(y)}. \tag{B2}$$

Note that the rules above are best understood by using intersecting circle diagrams. The formal proofs to obtain the results for probability distributions can e.g. use infinitesimal limiting versions of motivations for the probability cases.

Conditional Probability of the Minimum-Model and General Expressions

In this section some general properties of a minimum estimator are derived.

Towards that end, the following notation is introduced. The Kalman filter or Kalman smoother estimate of $P^{Total}(t')$ is denoted by:

$$\hat{x}_{pTotal}^{Kalman}(t' \mid Y^t) \equiv \hat{x}_{pTotal}^{Kalman}(t' \mid \{y(s)\}_{s \in [-\infty, t]}) \tag{B3}$$

-continued $$= \hat{x}_{pTotal}^{Kalman}(t' \mid \{y(s)\}_{s \in [t-T_{Lag}, t]}),$$

$$\hat{x}_{pTotal}^{Kalman}(t - T_{Lag} \mid Y^{t-T_{Lag}})).$$

Here t' denotes some time within $[t-T_{Lag}, t]$. The conditional distributions are, under mild conditions, all Gaussian sufficient statistics, i.e. only second order properties are needed in order to describe the conditional probability distributions. This is reflected in the conditioning in the last expression of (A3). The conditional distributions follow as:

$$f_{\hat{x}_{pTotal}^{Kalman}(t') \mid Y^t}(x) \in N(\hat{x}_{pTotal}^{Kalman}(t' \mid t), (\sigma_{pTotal}^{Kalman}(t' \mid t))^2), \tag{B4}$$

where indicates that the estimate is computed with the Kalman filter or, if t'<t, the Kalman smoother. The quantities $\hat{x}_{pTotal}^{Kalman}(t'|t)$ and $(\sigma_{pTotal}^{Kalman}(t'|t))^2$ denote the power estimate and the corresponding covariance, respectively, i.e. the inputs to the estimator. Note that (B4) assumes that the corresponding estimate at time $t-T_{Lag}$ is used as initial value for the Kalman filter.

Then the conditional distribution for the minimum value of the power estimate can be further developed. Towards that end the following model is assumed for the relation between $x_{pTotal}^0(t') = P^{0,Total}(t')$ that represents the true power and $\hat{x}_{pTotal}^{Kalman}(t'|t) = \hat{P}^{Total}(t'|t)$ that represents the estimate:

$$x_{pTotal}^0(t') = \hat{x}_{pTotal}^{Kalman}(t'|t) + \Delta x_{pTotal}(t'|t) \tag{B5}$$

$$x_{pTotal}^0(t') \in N(\hat{x}_{pTotal}^{Kalman}(t'|t), (\sigma_{pTotal}^{Kalman}(t'|t))^2). \tag{B6}$$

This is in line with the above discussion on sufficient statistics. The notation for the distribution of $\Delta x_{pTotal}(t'|t)$ is henceforward simplified to:

$$f_{\Delta x}(x). \tag{B7}$$

Note that this distribution does not have to be assumed to be Gaussian (although this is mostly the assumption made).

The conditional probability distribution of the minimum value of $x_{pTotal}^0(t') = P^{0,Total}(t')$, $t' \in [t-T_{Lag}, t]$ is then to be estimated using data y(t), obtained from the time interval $[-\infty, t]$. At this point it is suitable to refer to FIG. 4a, which shows the time intervals that are used in the development of the estimation algorithms that follow below.

Figure 9:
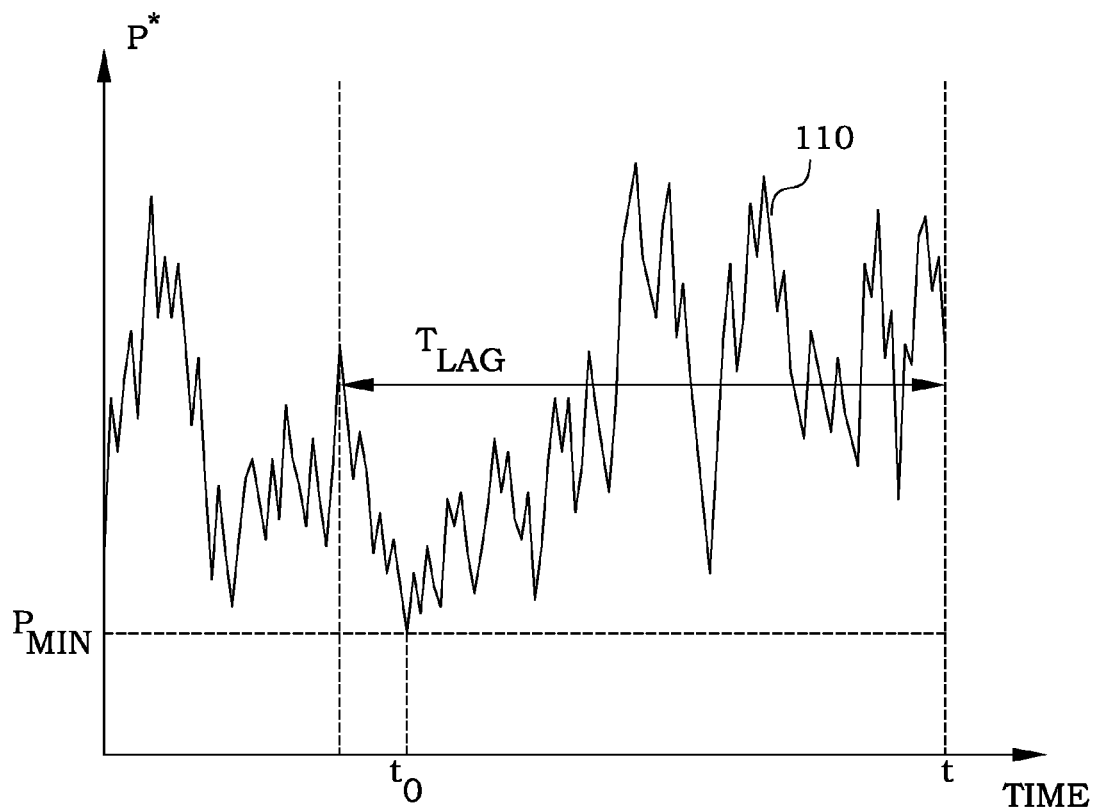
FIG. 9 is a diagram illustrating a typical time variation of a power quantity derived from total received power measurements.

FIG. 9 illustrates a diagram showing time variations 110 of a total received wideband power $P^{Total}(t)$. During some time intervals, the total received wideband power presents high values. However, at some occasions, the total received wideband power becomes small, indicating that many of the usual contributions to the measured power are absent.

As will be seen below, smoother estimates are theoretically required as inputs to the conditional probability estimation algorithm for the minimum power that operates over the time interval $\Im t-T_{Lag}, t]$. To formally retain optimality in the development, the smoother estimates should also be calculated using all data in $\Im t-T_{Lag}, t]$. However, in a practical implementation, these smoother estimates are typically computed using only a short snapshot of data around the selected smoothing time instance. Several such smoothing estimates, from $\Im t-T_{Lag}, t]$, are then combined to estimate the conditional probability distribution. In the coming discussion the interval $\Im t-T_{Lag}, t]$ is retained in all quantities though, so as not to complicate the development too much. A further simplification can be obtained by replacement of the smoother estimate with a Kalman filter estimate. Simulations indicate that this can be done with very little loss of performance.

The conditional distribution of the minimum value can now be written as follows (cf. (B5)):

$$f_{\min\{x^0_{pTotal}(t')\}_{t' \in [t-T_{Lag},t]} \mid Y^t, \min x^0_{pTotal}(t-T_{Lag})}(x), \quad (B8)$$

where the last quantity of (B8) denotes the initial information of the minimum value. In the following Bayes rule and the definition of conditional mean, for probability distributions, are used extensively.

Then apply Bayes rule and the definition of conditional probability to (B8) using the definitions:

$$A := \min\{x^0_{pTotal}(t')\}_{t' \in [t-T_{Lag},t]}$$

$$B := \min x^0_{pTotal}(t-T_{Lag})$$

$$C := Y^t$$

The following chain of equalities then holds, using Bayes rule, the definition of conditional probability distributions, and the result $f_{B,C|A}(x,y) = f_{(B|A),(C|A)}(x,y)$ (the latter result is easily checked by the drawing of a three-circle diagram):

$$f_{A|B,C}(x) = \frac{f_{B,C|A}(x,y)f_A(x)}{f_{B,C}(x,y)} \quad (B9)$$

$$= \frac{f_{(B|A),(C|A)}(x,y)f_A(x)}{f_{B,C}(x,y)}$$

$$= \frac{f_{(B|A)|(C|A)}(x)f_{C|A}(y)f_A(x)}{f_{B,C}(x,y)}$$

$$= \frac{f_{B|A,C}(x)f_{C|A}(y)f_A(x)}{f_{B,C}(x,y)}$$

$$= \frac{f_{B|A,C}(x)f_{A|C}(x)f_C(y)}{f_{B,C}(x,y)}.$$

The last step can again be easily verified by drawing circle diagrams. Now, according to the definitions above, the first factor of the numerator of (B9) is a prior and hence the conditioning disappears. The second factor of the numerator will be further expanded below, whereas the last factor of the numerator and the denominator can be treated as parts of a normalizing constant. Back-substitution of the definitions of A, B and C then proves the relation:

$$f_{\min\{x^0_{pTotal}(t')\}_{t' \in [t-T_{Lag},t]} \mid Y^t, \min x^0_{pTotal}(t-T_{Lag})}(x) = \quad (B10)$$

$$\frac{1}{c} f_{\min\{x^0_{pTotal}(t')\}_{t' \in [t-T_{Lag},t]} \mid Y^t} (x) f_{\min x^0_{pTotal}(t-T_{Lag})}(x).$$

One consequence of (B10) that needs to be kept in mind is that a smoothing problem is at hand. The Kalman filtering based pre-processing step treated above hence formally needs to include a Kalman smoother step. In practice, the Kalman filter is normally sufficient though.

Final Expansion of the Conditional Mean of the Minimum Power

The starting point of this subsection is equation (B10) that states that the conditional pdf (probability distribution function) is given as the product of a prior (initial value) and a measurement dependant factor. The prior is supplied by the user and should reflect the prior uncertainty regarding $P_N$. Note that whenever the sliding window is moved and a new estimate is calculated, the same prior is again applied. The prior is hence not updated in the basic setting of the estimator.

To state the complete conditional pdf some further treatment of the first factor of (B10) is needed. The error distribution $f_{\Delta P}(x)$ of (B7), together with the definitions (B5) and (B6) will be central towards this end. Further, in the calculations below, F( ) denotes a cumulative distribution, i.e. the integral of f. Pr(.) denotes the probability of an event.

The following equalities now hold for the first factor of (B10):

$$F_{\min\{x^0_{pTotal}(t')\}_{t' \in [t-T_{Lag},t]} \mid Y^t}(x) = Pr\left(\min\{x^0_{pTotal}(t')\}_{t' \in [t-T_{Lag},t]} \leq \right. \quad (B11)$$

$$x \mid Y^t)$$

$$= 1 - Pr\left(\min\{x^0_{pTotal}(t')\}_{t' \in [t-T_{Lag},t]} > \right.$$

$$x \mid Y^t)$$

$$= 1 - Pr(\forall\, t', \Delta x_{pTotal}(t' \mid t) >$$

$$x - \hat{x}^{Kalman}_{pTotal}(t' \mid t))$$

$$= 1 - \prod_{t' \in [t-T_{Lag},t]}$$

$$Pr(\Delta x_{pTotal}(t' \mid t) >$$

$$x - \hat{x}^{Kalman}_{pTotal}(t' \mid t))$$

$$= 1 - \prod_{t' \in [t-T_{Lag},t]}$$

$$(1 - Pr(\Delta x_{pTotal}(t' \mid t) \leq$$

$$x - \hat{x}^{Kalman}_{pTotal}(t' \mid t)))$$

$$= 1 - \prod_{t' \in [t-T_{Lag},t]}$$

$$(1 - F_{\Delta x(t' \mid t)}(x - \hat{x}^{Kalman}_{ptotal}(t' \mid t))).$$

The fourth equality of (B11) follows from the assumption that the Kalman smoother provides a sufficient statistics, i.e. (B5) and (B6). The last equality follows from (B7). Obviously, the most natural assumption is to use a Gaussian distribution for $F_{\Delta P(s)}$. However, (B11) actually allows other distributions as well.

The final step in the derivation of the first factor of the distribution function is to differentiate (B11), obtaining:

$$f_{\min\{x^0_{pTotal}(t')\}_{t' \in [t-T_{Lag},t]} \mid Y^t}(x) = \frac{dF_{\min\{x^0_{pTotal}(t')\}_{t' \in [t-T_{Lag},t]} \mid Y^t}(x)}{dx} \quad (B12)$$

$$= \sum_{t' \in [t-T_{Lag},t]} f_{\Delta x(t' \mid t)}(x - \hat{x}^{Kalman}_{pTotal}(t' \mid t))$$

$$\prod_{\substack{q \in [t-T_{Lag},t] \\ q \neq t'}}$$

-continued $$(1 - F_{\Delta x(t'|t)}(x - \hat{x}_{pTotal}^{Kalman}(q|t)))$$

Combining with (B10), gives the end result:

$$f_{min\{x_{pTotal}^0(t')\}_{t' \in [t-T_{Lag},t]}|Y^t, min x_{pTotal}^0(t-T_{Lag})}(x) = \quad (B13)$$

$$\frac{1}{c}\left(\sum_{t' \in [t-T_{Lag},t]} f_{\Delta x(t'|t)}(x - \hat{x}_{pTotal}^{Kalman}(t'|t))\right.$$

$$\left.\prod_{\substack{q \in [t-T_{Lag},t] \\ q \neq t'}} (1 - F_{\Delta x(t'|t)}(x - \hat{x}_{pTotal}^{Kalman}(q|t)))\right) f_{min x_{pTotal}^0(t-T_{Lag})}(x)$$

This result constitutes the output 79 referred to in connection with FIG. 7. The expression may look complex. It is fortunately straightforward to evaluate since it is a one dimensional function of Gaussian and cumulative Gaussian distributions given by:

$$f_{\Delta x(t'|t)}(x - \hat{x}_{pTotal}^{Kalman}(t'|t)) = \frac{1}{\sqrt{2\pi}\,\sigma_{pTotal}^{Kalman}(t'|t)} e^{-\frac{(x - \hat{x}_{pTotal}^{Kalman}(t'|t))^2}{2(\sigma_{pTotal}^{Kalman}(t'|t))^2}} \quad (B14)$$

$$F_{\Delta x(t'|t)}(x - \hat{x}_{pTotal}^{Kalman}(t'|t)) = \int_{-\infty}^{x - \hat{x}_{pTotal}^{Kalman}(t'|t)} f_{\Delta x(t'|t)}(y) dy \quad (B15)$$

$$= \frac{1}{2}\text{erfc}\left(-\frac{(x - \hat{x}_{pTotal}^{Kalman}(t'|t))}{\sqrt{2}\,\sigma_{pTotal}^{Kalman}(t'|t)}\right).$$

The quantities $\hat{x}_{pTotal}^{Kalman}(t'|t)$ and $\sigma_{pTotal}^{Kalman}(t'|t)$ are readily available as outputs from the Kalman smoother, or the simpler Kalman filter.

If a noise floor value is to be provided as an output, a mean value computation is performed on the output distribution.

REFERENCE

[1] T. Söderström, Discrete Time Stochastic Systems. London, UK: Springer, 2002, pp. 12-14, 123-126, 142, 149-150, 247.

The invention claimed is:

1. A method for noise rise estimation in a wireless communications system, comprising the steps of:
measuring received total wideband power a plurality of times;
measuring site communication throughput a plurality of times;
processing said measured site communication throughput into a time averaged site communication throughput;
estimating a probability distribution for received total wideband power from at least said measured received total wideband power;
computing an estimate of a noise floor measure based on said probability distribution for received total wideband power;
calculating a noise rise measure based at least on said probability distribution for received total wideband power and said estimate of a noise floor measure; and,
providing an adjustment of said noise rise measure based on said averaged site communication throughput, wherein said step of providing an adjustment is performed by adjusting a variance of said probability distribution for received total wideband power based on said averaged site communication throughput.

2. The method according to claim 1, wherein said step of providing an adjustment is performed by adjusting said noise rise measure based on said averaged site communication throughput.

3. The method according to claim 2, wherein said noise rise measure is adjusted according to a predetermined function of said averaged site communication throughput.

4. The method according to claim 1, wherein said step of providing an adjustment is performed by adjusting said estimate of a noise floor measure based on said averaged site communication throughput.

5. The method according to claim 4, wherein said step of providing an adjustment is performed by adjusting said estimate of a noise floor measure according to a predetermined function of said averaged site communication throughput.

6. The method according to claim 1, wherein said step of estimating a probability distribution for received total wideband power is performed by a Kalman filtering process.

7. The method according to claim 1, wherein said step of estimating a probability distribution for received total wideband power is performed further based on said averaged site communication throughput.

8. The method according to claim 7, wherein said step of estimating a probability distribution for received total wideband power is performed by a Kalman filtering process in which a noise contribution is modelled as dependent on said averaged site communication throughput.

9. A wireless communications system node adapted to perform noise rise estimation, comprising:
a power sensing arrangement for measuring received total wideband power;
means for obtaining a site communication throughput;
averaging means operative to process said measured site communication throughput into a time averaged site communication throughput; and,
processor means, connected to said power sensing arrangement and said averaging means, said processor means operative to:
estimate a probability distribution for received total wideband power from at least said measured received total wideband power;
compute an estimate of a noise floor measure based on said probability distribution for received total wideband power;
calculate a noise rise measure based at least on said probability distribution for received total wideband power and said estimate of a noise floor measure; and,
provide an adjustment of said noise rise measure based on said averaged site communication throughput, wherein said processor means is operative to adjust a variance of said probability distribution for received total wideband power based on said averaged site communication throughput.

10. The wireless communications system node according to claim 9, wherein said processor means being arranged for adjusting said noise rise measure based on said averaged site communication throughput.

11. The wireless communications system node according to claim 10, wherein said processor means being arranged for adjusting said noise rise measure according to a predetermined function of said averaged site communication throughput.

12. The wireless communications system node according to claim 9, wherein said processor means is operative to adjust said estimate of a noise floor measure based on said averaged site communication throughput.

13. The wireless communications system node according to claim 12, wherein said processor means is operative to adjust said estimate of a noise floor measure according to a predetermined function of said averaged site communication throughput.

14. The wireless communications system node according to claim 9, wherein said processor means is operative to estimate said probability distribution for received total wideband power by a Kalman filtering process.

15. The wireless communications system node according to claim 9, wherein said processor means is operative to estimate said probability distribution for received total wideband power further based on said averaged site communication throughput.

16. The wireless communications system node according to claim 15, wherein said processor means is operative to estimate said probability distribution for received total wideband power by a Kalman filtering process in which a noise contribution is modelled as dependent on said averaged site communication throughput.

* * * * *

UNITED STATES PATENT AND TRADEMARK OFFICE
CERTIFICATE OF CORRECTION

PATENT NO. : 8,170,492 B2
APPLICATION NO. : 12/296751
DATED : May 1, 2012
INVENTOR(S) : Wigren et al.

It is certified that error appears in the above-identified patent and that said Letters Patent is hereby corrected as shown below:

On the Face Page, in Field (73), under "Assignee", in Column 1, Line 2, delete "(PUBL)" and insert -- (PUBL), Stockholm (SE) --, therefor.

In Column 3, Line 1, delete "Preferably;" and insert -- Preferably, --, therefor.

In Column 5, Line 38, delete "$Pi^{Code}(t)$." and insert -- $P_i^{Code}(t)$. --, therefor.

In Column 9, Line 50, delete "$\underline{V}_n$" and insert -- $\overline{V}_n$ --, therefor.

In Column 10, in Equation (7), Line 1, delete "$\underline{V})+k_2)$" and insert -- $\overline{V})+k_2)$ --, therefor.

In Column 10, Line 28, delete "$r_{measurement}$" and insert -- $r_{Measurement}$ --, therefor.

In Column 12, Line 39, in Equation (A2), delete "++" and insert -- + --, therefor.

In Column 12, Line 41, in Equation (A3), delete "--" and insert -- - --, therefor.

In Column 13, Line 24, delete "defiition" and insert -- definition --, therefor.

In Column 14, Line 18, delete "where" and insert -- where $^{Kalman}$ --, therefor.

In Column 14, Line 57, delete "$\tilde{s}(t-T_{Lag},t]$." and insert -- $(t-T_{Lag},t]$. --, therefor.

In Column 14, Line 59, delete "$\tilde{s}(t-T_{Lag},t]$." and insert -- $(t-T_{Lag},t]$. --, therefor.

Signed and Sealed this
Eighteenth Day of September, 2012

David J. Kappos
*Director of the United States Patent and Trademark Office*

CERTIFICATE OF CORRECTION (continued)
U.S. Pat. No. 8,170,492 B2

In Column 14, Line 63, delete "$\Im t - T_{Lag}, t]$," and insert -- $[t - T_{Lag}, t]$. --, therefor.

In Column 14, Line 65, delete "$\Im t - T_{Lag}, t]$," and insert -- $[t - T_{Lag}, t]$ --, therefor.